(12) United States Patent
Lim

(10) Patent No.: US 12,287,074 B2
(45) Date of Patent: Apr. 29, 2025

(54) INFRARED LAMP DEVICE AND INFRARED LAMP SYSTEM FOR A VEHICLE

(71) Applicants: HYUNDAI MOTOR COMPANY, Seoul (KR); KIA CORPORATION, Seoul (KR)

(72) Inventor: Jung Wook Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 143 days.

(21) Appl. No.: 18/100,949

(22) Filed: Jan. 24, 2023

(65) Prior Publication Data

US 2024/0077184 A1    Mar. 7, 2024

(30) Foreign Application Priority Data

Sep. 6, 2022 (KR) ................. 10-2022-0112859

(51) Int. Cl.
| | |
|---|---|
| F21S 41/13 | (2018.01) |
| F21S 43/10 | (2018.01) |
| G01S 7/481 | (2006.01) |
| G02B 26/08 | (2006.01) |
| H04N 23/20 | (2023.01) |
| F21W 103/60 | (2018.01) |
| G02B 5/10 | (2006.01) |
| G02B 5/20 | (2006.01) |

(52) U.S. Cl.
CPC ............... *F21S 41/13* (2018.01); *F21S 43/10* (2018.01); *G01S 7/481* (2013.01); *G02B 26/0816* (2013.01); *H04N 23/20* (2023.01); *F21W 2103/60* (2018.01); *G02B 5/10* (2013.01); *G02B 5/208* (2013.01)

(58) Field of Classification Search
CPC .......... F21S 41/13; F21S 43/10; F21S 41/285; F21S 41/321; F21S 41/675; F21S 43/13; F21S 43/255; F21S 43/31; F21S 41/25; G01S 7/481; G02B 26/0816; G02B 5/10; G02B 5/208; H04N 23/20; F21W 2103/60; F21W 2107/10; B60Q 1/0023; B60Q 1/04; B60Q 2400/50; B60R 1/27; B60R 1/30; B60R 2300/106; F21V 9/04
See application file for complete search history.

(56) References Cited

U.S. PATENT DOCUMENTS

| | | | | |
|---|---|---|---|---|
| 4,095,881 | A | * | 6/1978 | Maddox ............ F21V 7/09 355/71 |
| 5,660,462 | A | * | 8/1997 | Bockley ............ H01J 61/025 362/256 |
| 11,009,696 | B2 | * | 5/2021 | Mukojima ............ F21S 41/151 |

(Continued)

FOREIGN PATENT DOCUMENTS

KR        20090096994 A        9/2009

*Primary Examiner* — Timothy R Newlin
(74) *Attorney, Agent, or Firm* — Lempia Summerfield Katz LLC

(57) ABSTRACT

An infrared lamp device for a mobility vehicle and an infrared lamp system for a mobility vehicle may display whether an infrared sensor, for sensing peripheral environments during night traveling so as to secure traveling stability, is operating, and use infrared rays not only to sense peripheral environments, but also to deliver messages, thereby securing traveling stability and convenience.

18 Claims, 10 Drawing Sheets

(56) References Cited

U.S. PATENT DOCUMENTS

| | | | | |
|---|---|---|---|---|
| 2006/0002128 | A1* | 1/2006 | Suzuki | F21S 41/334 |
| | | | | 362/509 |
| 2006/0007544 | A1* | 1/2006 | Suzuki | F21V 9/04 |
| | | | | 359/533 |
| 2009/0196060 | A1* | 8/2009 | Sazuka | F21S 41/147 |
| | | | | 362/509 |
| 2012/0051074 | A1* | 3/2012 | Takahashi | F21V 13/00 |
| | | | | 362/509 |
| 2014/0042325 | A1* | 2/2014 | Yamamura | F21S 45/43 |
| | | | | 362/231 |
| 2015/0375672 | A1* | 12/2015 | Takahashi | F21S 41/25 |
| | | | | 362/510 |
| 2017/0038458 | A1* | 2/2017 | Sugawara | G01S 17/931 |
| 2017/0184764 | A1* | 6/2017 | Matsuyuki | G02B 5/207 |
| 2017/0339376 | A1* | 11/2017 | Cao | G08B 17/103 |
| 2018/0099605 | A1* | 4/2018 | Ahn | F21S 41/147 |
| 2018/0170259 | A1* | 6/2018 | Maejima | H04N 23/63 |
| 2019/0011105 | A1* | 1/2019 | Lee | F21S 41/147 |
| 2019/0176683 | A1* | 6/2019 | Lim | B60Q 1/143 |
| 2019/0322209 | A1* | 10/2019 | Sugiyama | F21S 43/26 |
| 2020/0333182 | A1* | 10/2020 | Ahmed | G01J 1/4257 |
| 2020/0370886 | A1* | 11/2020 | Chen | G03B 13/20 |
| 2021/0004990 | A1* | 1/2021 | Kamio | B60Q 1/143 |
| 2021/0030345 | A1* | 2/2021 | Luo | H04N 25/131 |
| 2021/0110217 | A1* | 4/2021 | Gunel | G06V 20/56 |
| 2021/0129755 | A1* | 5/2021 | Imamura | G02B 5/3033 |
| 2021/0367116 | A1* | 11/2021 | Eom | H01L 33/56 |
| 2022/0314868 | A1* | 10/2022 | Hong | B60Q 1/068 |
| 2022/0338327 | A1* | 10/2022 | Mochizuki | H04N 5/33 |
| 2022/0342226 | A1* | 10/2022 | Liu | G02B 27/142 |
| 2023/0003358 | A1* | 1/2023 | Kang | F21S 41/40 |
| 2023/0081252 | A1* | 3/2023 | Mochizuki | B60Q 1/14 |
| | | | | 362/465 |
| 2023/0119681 | A1* | 4/2023 | Katsuda | G02B 5/208 |
| | | | | 359/350 |
| 2023/0331158 | A1* | 10/2023 | Huizen | H04N 23/56 |
| 2024/0157768 | A1* | 5/2024 | Abadie | B32B 17/10174 |

\* cited by examiner

INFRARED LAMP DEVICE AND INFRARED LAMP SYSTEM FOR A VEHICLE

CROSS-REFERENCE TO RELATED APPLICATIONS

This application claims priority to and the benefit of Korean Patent Application No. 10-2022-0112859, filed on Sep. 6, 2022, the entire contents of which are incorporated herein by reference.

FIELD

The present disclosure relates to an infrared lamp device and system for a vehicle. More particularly, the present disclosure relates an infrared lamp device and system in which infrared rays are used not only to sense peripheral environments, but also to deliver messages, thereby securing traveling stability and convenience.

BACKGROUND

In general, a headlamp of a vehicle emits light in the traveling direction of the vehicle such that the front path of the vehicle is illuminated during night traveling and the driver is provided with visual information. Because the front field of view is thus provided to the driver at night, other vehicles and obstacles on roads can be identified and safe traveling may be secured for the vehicle.

A structure for controlling bright and dark parts in connection with light emitted by a headlight has recently been utilized to ensure that drivers of vehicles traveling in the opposite direction are not dazzled. For example, night vision systems, in which infrared lamps emit light in the forward direction, and cameras installed in the vehicles record reflected images, have be used to provide drivers with visual information.

Emitted infrared rays have a red color due to wavelength characteristics, thereby posing a problem in that infrared rays emitted to the front or rear of vehicles may cause confusion with other lamp functions and may violate regulations. Infrared rays in specific wavelength ranges are filtered out through filters, and the product value is degraded because it is impossible to identify by the naked eye whether infrared lamps are operating.

In addition, infrared lamps perform only the function of sensing objects, thereby limiting the functionality of the infrared lamps.

The above descriptions regarding background technologies have been made only to help understanding of the background of the present disclosure, and are not to be deemed by those having ordinary skill in the art to correspond to already-known prior arts.

SUMMARY

An object of the present disclosure is to provide an infrared lamp device and an infrared lamp system for a vehicle, wherein the device and system display whether an infrared sensor, for sensing peripheral environments during night traveling so as to secure traveling stability, is operating, and use infrared rays not only to sense peripheral environments, but also to deliver messages, thereby securing traveling stability and convenience.

In accordance with an embodiment of the present disclosure, an infrared lamp device for a mobility vehicle may include: a light source configured to emit infrared rays; a reflector configured such that infrared rays from the light source are incident thereon, and configured to reflect the incident infrared rays such that some infrared rays are moved in a direction for object sensing, and remaining infrared rays are moved in a direction for infrared display; and an infrared filter provided in a position in which infrared rays are reflected by the reflector and moved in the direction for object sensing, the infrared filter filtering out infrared rays in a preconfigured wavelength range, wherein some infrared rays reflected by the reflector and moved in the direction for infrared display are emitted in a visible state.

The infrared lamp device for a mobility vehicle may further include a transmissive lens disposed such that some infrared rays reflected by the reflector and moved in the direction for infrared display are incident thereon and then emitted.

The transmissive lens may have an image-forming bezel having a hole formed in a figure or character shape such that infrared rays pass through the hole of the image-forming bezel and are emitted as lighting image in the figure or character shape.

The infrared lamp device for a mobility vehicle may further include a sub reflector provided between the reflector and the infrared filter so as to reflect infrared rays moved in the direction for object sensing such that the infrared rays are moved in the direction for infrared display.

The infrared lamp device for a mobility vehicle may further include a transmissive lens disposed such that infrared rays reflected by the sub reflector and moved in the direction for infrared display are incident thereon and then emitted.

The sub reflector and the transmissive lens, or one of the sub reflector and the transmissive lens may include a color converter configured such that infrared rays moved in the direction for infrared display are converted to a specific color and then emitted.

An infrared lamp system for a mobility vehicle according to the present disclosure may include: a first infrared module including a first light source, a first reflector, and an infrared filter such that infrared rays in an invisible wavelength range are moved to a long distance or a short distance by the infrared filter; and a second infrared module including a second light source and a second reflector such that infrared rays are emitted to a short distance in a visible state.

The first infrared module and the second infrared module may be integrally configured in a headlamp or a rear lamp.

The infrared lamp system for a mobility vehicle may further include: an imaging device configured to provide captured image information by capturing images around a mobility vehicle and sensing infrared rays; and a display device configured to display captured image information and infrared rays on the basis of captured image information input through the imaging device.

The first infrared module may be installed such that infrared rays are emitted to one of the fronts and the rear of the mobility vehicle or to each of the front and the rear of the mobility vehicle, and the second infrared module may be installed such that infrared rays are emitted to the side of the mobility vehicle.

Each of the first infrared module and the second infrared module may have an image-forming bezel having a hole formed in a specific image such that light emitted in the direction of infrared display is projected onto a road surface in a pattern following the specific image.

The first reflector of the first infrared module may be configured to change the direction of movement of infrared rays which have been incident after an angle change according to a command from a controller.

The infrared lamp system for a mobility vehicle may further include a controller configured to control the first infrared module and the second infrared module, the controller may be configured to i) receive long distance-related object information from the first infrared module when the mobility vehicle travels at a predetermined speed or higher and ii) receive short distance-related object information from the first infrared module and the second infrared module when the mobility vehicle travels below the predetermined speed. The visible infrared rays may be emitted around the mobility vehicle by the second infrared module such that a lighting pattern is formed on the road surface.

An infrared lamp system for a mobility vehicle according to the present disclosure may include: a first infrared module including a first light source, a first reflector, and a first infrared filter, the first infrared module being installed such that infrared rays are emitted to the front or rear of a mobility vehicle, and configured such that infrared rays in an invisible wavelength range are moved to a long distance by the infrared filter; a second infrared module including a second light source, a second reflector, and a second infrared filter, the second infrared module being installed such that infrared rays are emitted to the front or rear of the mobility vehicle, and configured such that infrared rays in an invisible wavelength range are moved to a long distance and to a short distance by the infrared filter; a third infrared module including a third light source and a third reflector, the third infrared module being installed such that infrared rays are emitted to the side of the mobility vehicle, and configured such that infrared rays are emitted in a visible state to a short distance; and a controller configured to control the first infrared module, the second infrared module, and the third infrared module.

The infrared lamp system for a mobility vehicle may further include: an imaging device configured to provide captured image information by capturing images around the mobility vehicle and sensing infrared rays; and a display device configured to display captured image information and infrared rays on the basis of captured image information input through the imaging device.

The second reflector of the second infrared module may include a first reflecting surface and a second reflecting surface having different radii of curvature, onto which infrared rays emitted by the second light source are incident, the first reflecting surface may be formed such that incident infrared rays are moved to a long distance, and the second reflecting surface may be formed such that incident infrared rays are moved to a short distance.

The second infrared module may include a projection lens disposed such that infrared rays reflected by the second reflector are incident thereon, and the projection lens may have a total internal reflection portion formed to totally reflect some of the infrared rays incident through the second light source or the second reflector, thereby emitting some of the infrared rays to a short distance.

The controller may be configured to i) receive long distance-related object information from the first infrared module and the second infrared module when the mobility vehicle travels at a predetermined speed or higher and ii) receive short distance-related object information from the second infrared module and the third infrared module when the mobility vehicle travels below the predetermined speed. Visible infrared rays may be emitted around the mobility vehicle by the third infrared module such that a lighting pattern is formed on the road surface.

The infrared lamp device for a mobility vehicle and the infrared lamp system for a mobility vehicle, having the above-described structures, may display whether an infrared sensor, for sensing peripheral environments during night traveling so as to secure traveling stability, is operating, and use infrared rays not only to sense peripheral environments, but also to deliver messages, thereby securing traveling stability and convenience.

BRIEF DESCRIPTION OF THE DRAWING

The above and other aspects, features, and advantages of the present disclosure will be more apparent from the following detailed description taken in conjunction with the accompanying drawings, in which.

DETAILED DESCRIPTION

Figure 1:
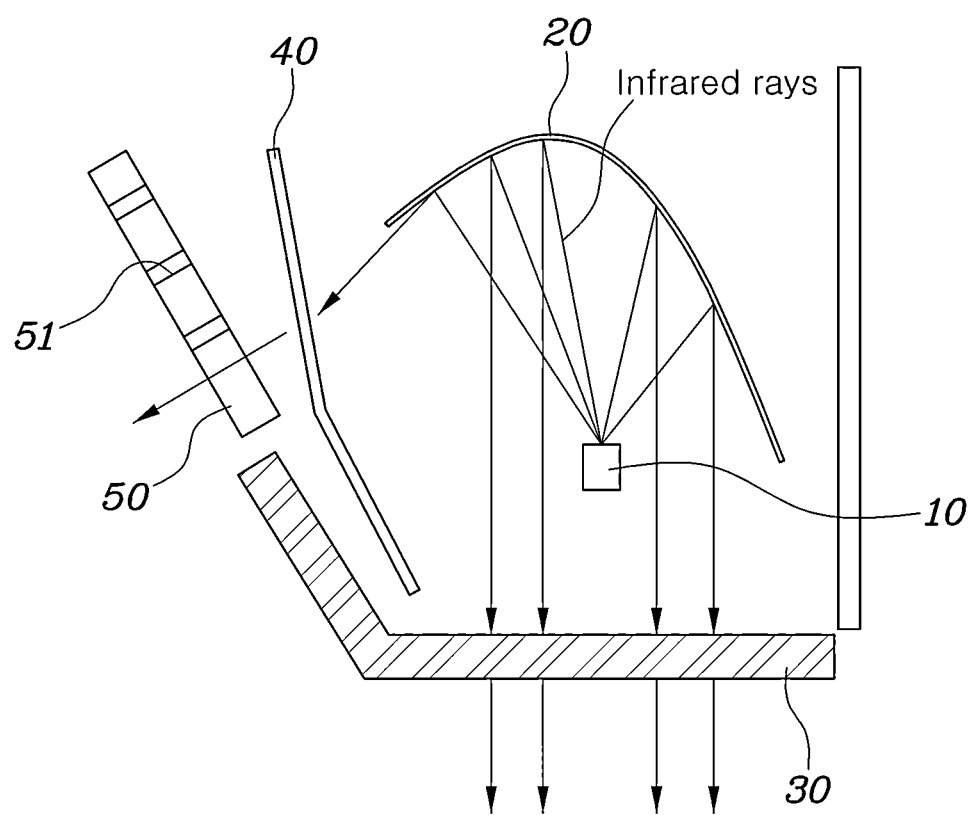
FIG. 1 illustrates an infrared lamp device for a mobility vehicle according to an embodiment of the present disclosure.

Hereinafter, an infrared lamp device and an infrared lamp system for a mobility vehicle according to embodiments of the present disclosure are described in detail with reference to the accompanying drawings.

The same or similar elements are given the same and similar reference numerals, so duplicate descriptions thereof may be omitted.

The terms "module" and "unit" used for the elements in the following description are given or interchangeably used in consideration of only the ease of writing the specification, and do not have distinct meanings or roles by themselves.

Throughout the specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in the context. When a component, device, element, or the like of the present disclosure is described as having a purpose or performing an operation, function, or the like, the component, device, or element should be considered herein as being "configured to" meet that purpose or to perform that operation or function.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A controller may include a communication device that communicates with other controllers or sensors in order to control functions in charge, a memory that stores an operating system or logic instructions, input/output information, and the like, and one or more processors that perform determinations, computations, decisions, and the like.

Figure 2:
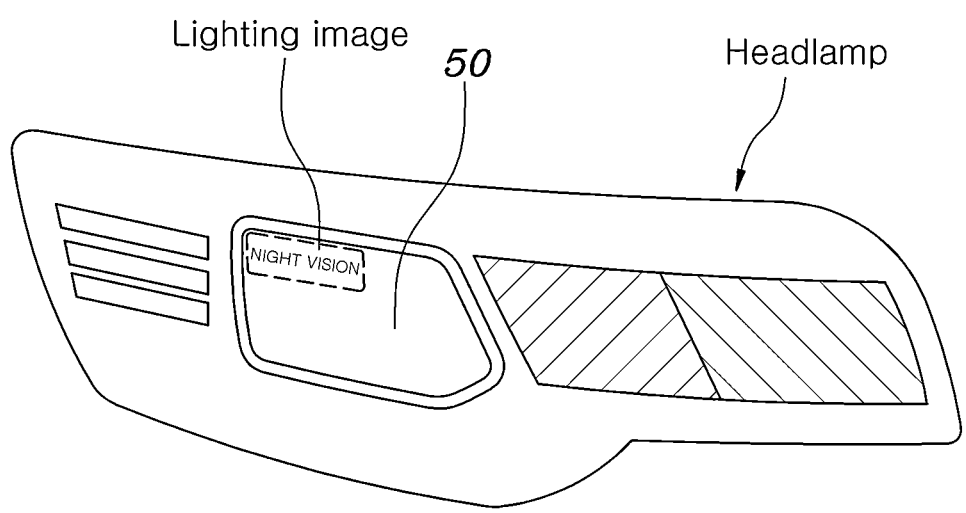
FIG. 2 illustrates an embodiment of the infrared lamp device for a mobility vehicle illustrated in FIG. 1.
Figure 3:
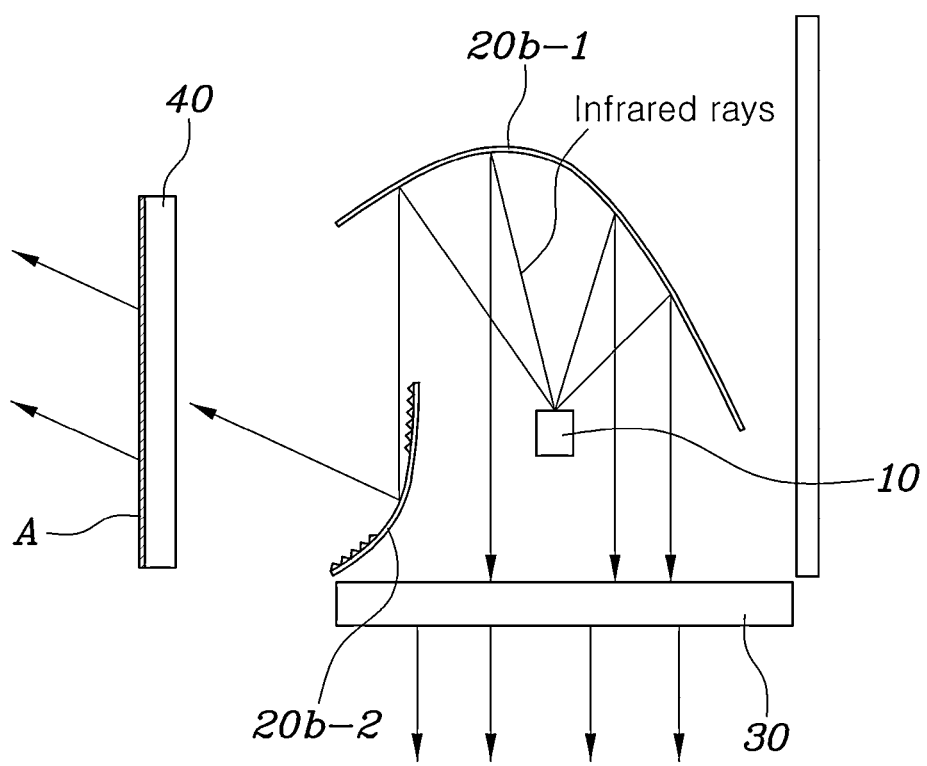
FIG. 3 illustrates an infrared lamp device for a mobility vehicle according to another embodiment of the present disclosure.

FIG. 1 illustrates an infrared lamp device for a mobility vehicle according to an embodiment of the present disclosure. FIG. 2 illustrates an embodiment of the infrared lamp device for a mobility vehicle illustrated in FIG. 1. FIG. 3 illustrates an infrared lamp device for a mobility vehicle according to another embodiment of the present disclosure.

Figure 4:
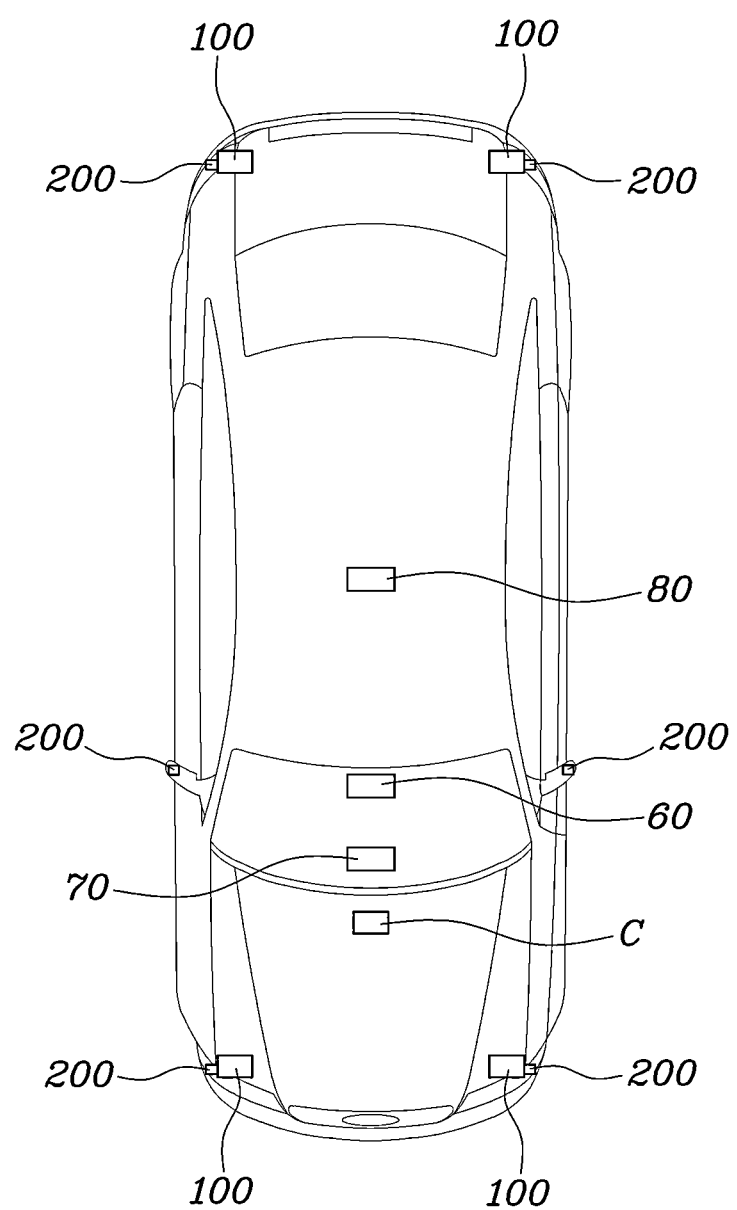
FIG. 4 illustrates the configuration of an infrared lamp system for a mobility vehicle according to an embodiment of the present disclosure.
Figure 5:
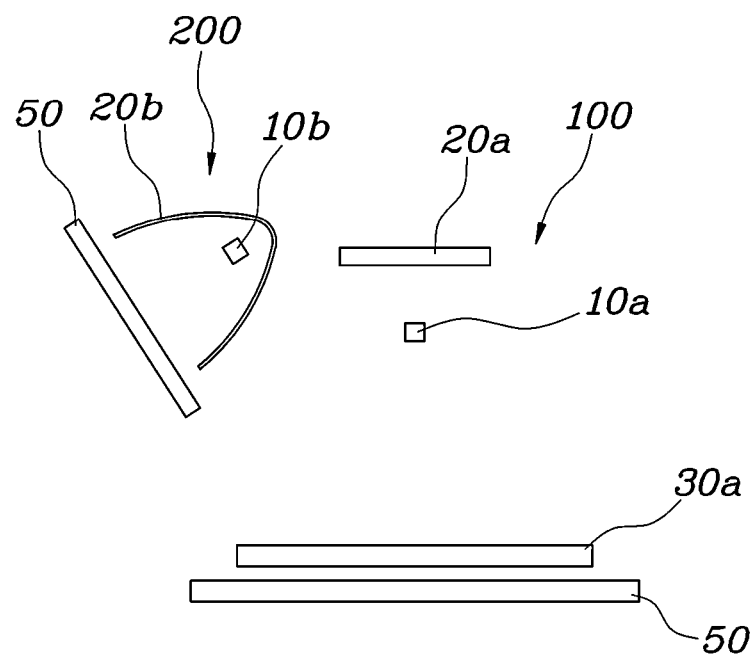
FIG. 5 illustrates an infrared lamp device according to the infrared lamp system for a mobility vehicle illustrated in FIG. 4.
Figure 6:
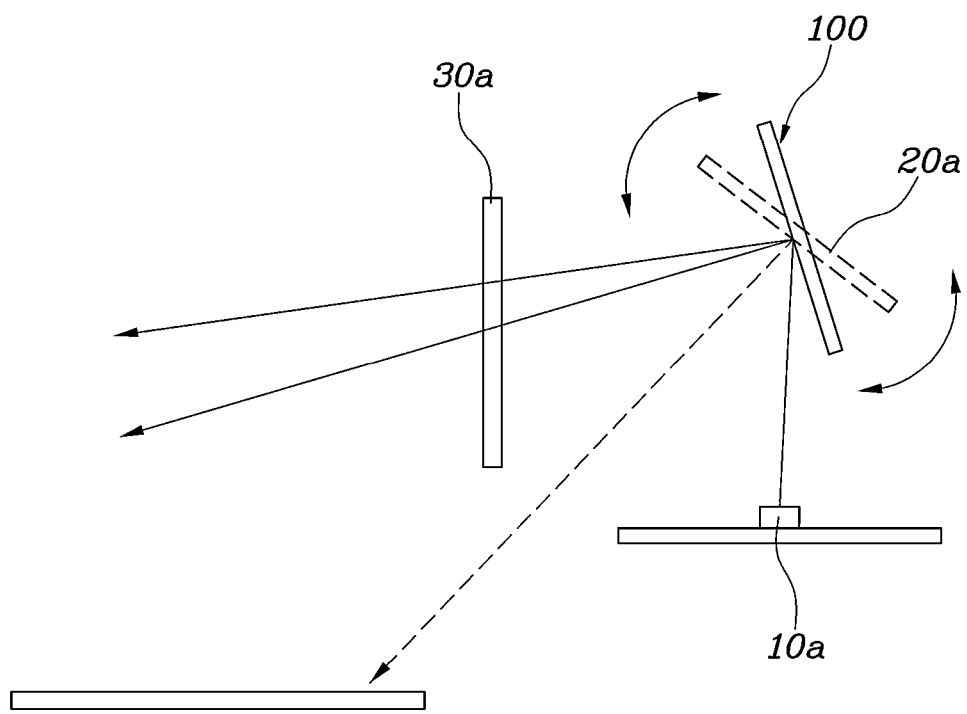
FIG. 6 illustrates operations of a first reflector in connection with an infrared lamp device according to the infrared lamp system for a mobility vehicle illustrated in FIG. 4.

FIG. 4 illustrates a configuration of an infrared lamp system for a mobility vehicle according to an embodiment of the present disclosure. FIG. 5 illustrates an infrared lamp device according to the infrared lamp system for a mobility vehicle illustrated in FIG. 4. FIG. 6 illustrates operations of a first reflector in connection with an infrared lamp device according to the infrared lamp system for a mobility vehicle illustrated in FIG. 4.

Figure 7:
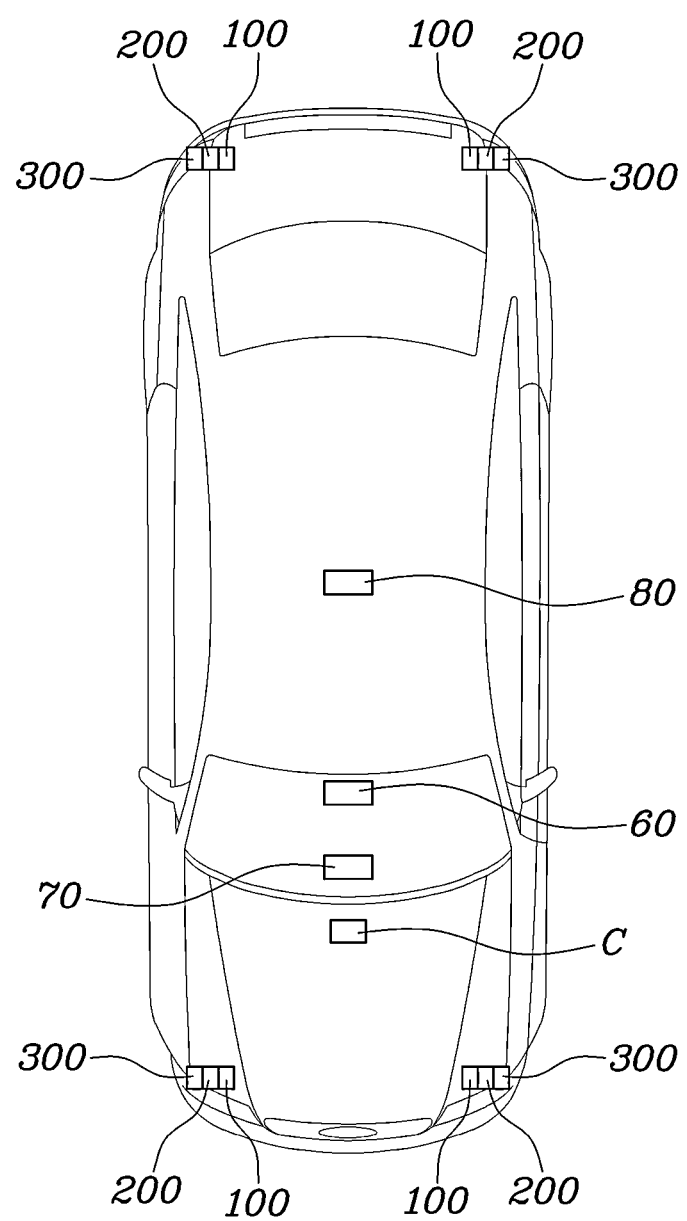
FIG. 7 illustrates the configuration of an infrared lamp system for a mobility vehicle according to another embodiment of the present disclosure.
Figure 8:
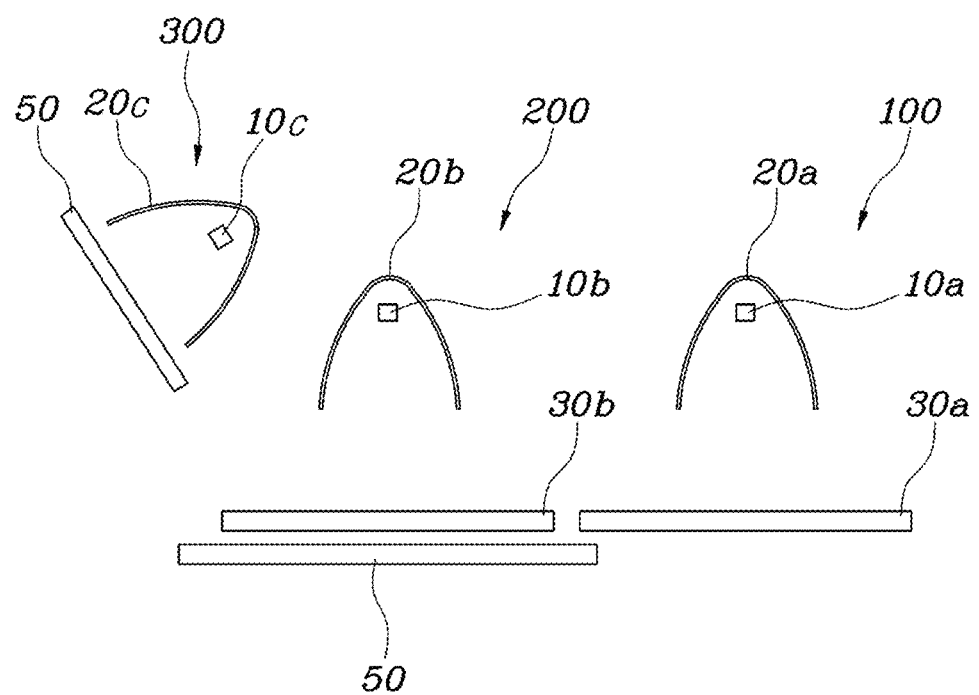
FIG. 8 illustrates an infrared lamp device according to the infrared lamp system for a mobility vehicle illustrated in FIG. 7.

FIG. 7 illustrates a configuration of an infrared lamp system for a mobility vehicle according to another embodiment of the present disclosure. FIG. 8 illustrates an infrared lamp device according to the infrared lamp system for a mobility vehicle illustrated in FIG. 7.

Figure 9:
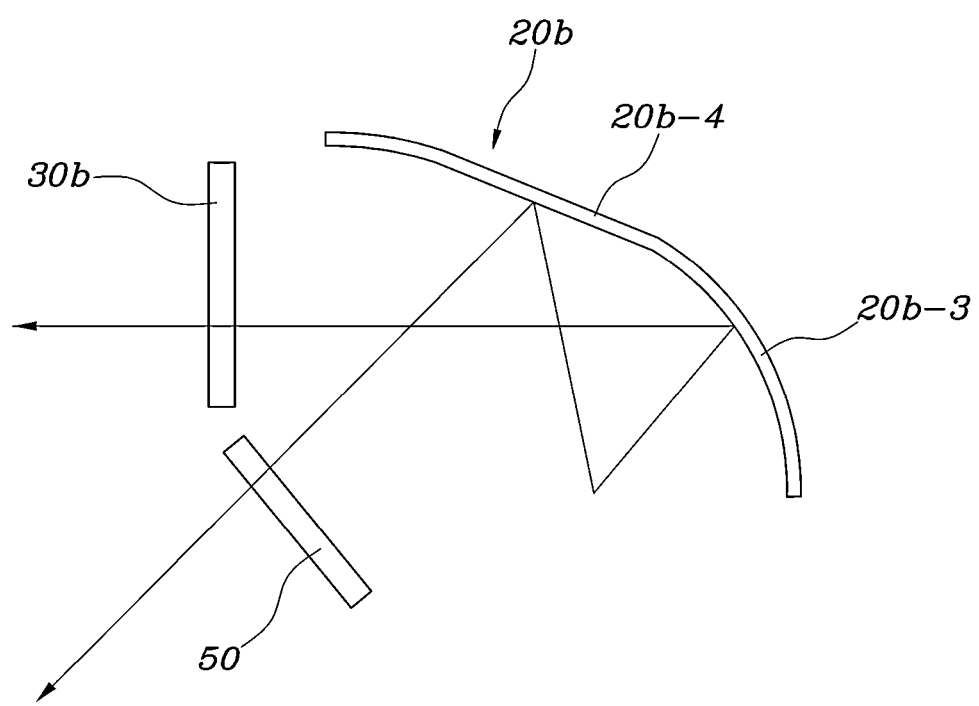
FIG. 9 illustrates an embodiment of a second infrared module according to the present disclosure.
Figure 10:
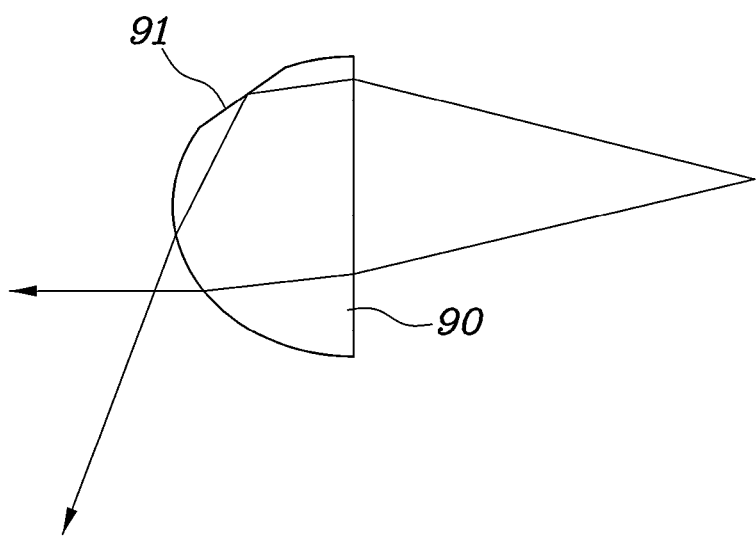
FIG. 10 illustrates another embodiment of a second infrared module according to the present disclosure.

FIG. 9 illustrates an embodiment of a second infrared module according to the present disclosure. FIG. 10 illustrates another embodiment of a second infrared module according to the present disclosure.

An infrared lamp device for a mobility vehicle and an infrared lamp system for a mobility vehicle according to the present disclosure sense peripheral environments through infrared ray radiation, thereby securing traveling stability, and display whether an infrared lamp is operating, thereby securing product values. In addition, infrared rays are used not only to sense peripheral environments, but also to deliver messages to other vehicles or pedestrians around the mobility vehicle, thereby securing stability and convenience.

As illustrated in FIG. 1, an infrared lamp device for a mobility vehicle according to an embodiment of the present disclosure may include a light source 10 that may be configured to emit infrared rays. The infrared lamp device may also include a reflector 20 and an infrared filter 30. The reflector 20 may be disposed and/or otherwise configured such that infrared rays from the light source 10 are incident thereon, and the incident infrared rays are reflected. In an aspect, the reflector 20 may be configured such that some of the infrared rays from the light source 10 move in a direction of object sensing, and the remaining infrared rays from the light source 10 move in a direction for infrared display. The infrared filter 30 may be provided in a position in which infrared rays reflected by the reflector 20 move in the direction for object sensing, thereby filtering out infrared rays in a preconfigured wavelength range. Accordingly, some infrared rays reflected by the reflector 20 and moved in the direction for object sensing may be emitted in a visible state.

The light source 10 may be configured to emit infrared rays and to record information regarding objects based on reflection of the infrared rays.

The reflector 20 may be formed to have a curvature such that the infrared rays from the light source 10, that are incident on the reflector 20, move with a directionality. The curved shape of the reflector 20 may cause some infrared rays to move in a direction for object sensing, and may cause the remaining infrared rays to move in a direction for infrared display. The direction for object sensing may be the forward or backward traveling direction of the mobility vehicle. The direction for infrared display may be a direction for outward display, and may be determined according to the exterior of the lamp. In an aspect, the reflector 20 may thus be formed such that most infrared rays move in the direction for object sensing, and some of the remaining infrared rays move in the direction for infrared display.

The infrared filter 30 may be configured to filter out visible wavelength ranges of infrared rays such that infrared rays in wavelength ranges invisible to human eyes are emitted. As a result, visible infrared rays may be blocked in the direction for object sensing (corresponding to the mobility vehicle traveling direction), and some visible infrared rays are emitted in the direction for infrared display, thereby making operations of the infrared lamp identifiable from outside the mobility vehicle.

In other words, according to embodiments of the present disclosure, external environments may be sensed through infrared rays, and some visible infrared rays may be emitted in a direction other than the forward or backward direction, including the mobility vehicle traveling direction, thereby indicating that external environments are sensed through infrared rays.

With continued reference to FIG. 1, the infrared lamp device may further include a transmissive lens 40 disposed such that some infrared rays reflected by the reflector 20 and moved in the direction for infrared display are incident thereon and then emitted. The transmissive lens 40 is provided such that infrared rays reflected by the reflector 20 and moved are emitted as visible rays. In an aspect, the transmissive lens 40 may be color-coated such that the color of emitted infrared rays is changed to a specific color.

The transmissive lens 40 may include an image-forming bezel 50 having a hole 51 in the shape of a figure or a character such that infrared rays pass through the hole 51 of the image-forming bezel 50 and are emitted as a lighting image having the shape of the figure or the character.

The image-forming bezel 50 may be provided outside of the transmissive lens 40 such that infrared rays reflected by the reflector 20 and moved in the direction for infrared display pass through the hole 51 of the image-forming bezel 50, thereby emitting a lighting image according to the shape of the hole 51. For example, as illustrated in FIG. 2, the image-forming bezel 50 may have a "NIGHT VISION" hole such that, when sensing peripheral environments through infrared rays, a part of the head lamp displays "NIGHT VISION", thereby indicating to the outside that infrared rays are being emitted.

In operation, according to embodiments of the present disclosure, infrared rays emitted by the light source 10 are reflected by the reflector 20 and move in a direction for object sensing (mobility vehicle traveling direction) and in a direction for infrared display (for indicating whether infrared operation is occurring). Infrared rays moving in the direction for object sensing pass through the infrared filter 30, and visible rays are filtered out. Infrared rays moving in the direction for infrared display are emitted as a specific lighting image, making it possible to identify when the infrared lamp is operating.

As illustrated in FIG. 3, an infrared lamp device for a mobility vehicle according to another embodiment includes the light source 10 configured to emit infrared rays, a main reflector 20*b*-1, a sub reflector 20*b*-2, and the infrared filter 30. The main reflector 20*b*-1 may be configured such that infrared rays from the light source 10 are incident thereon and then reflected to move in a direction of object sensing. The infrared filter 30 may be provided in a position in which infrared rays reflected by the reflector 20 move in the direction for object sensing, thereby filtering out infrared rays in a preconfigured wavelength range. The sub reflector 20*b*-2 may be provided between the reflector 20 and the infrared filter 30 so as to reflect infrared rays moving in the direction for object sensing such that the infrared rays move in the direction for infrared display.

The light source 10 may be configured to emit infrared rays and to record information regarding objects based on reflection of the infrared rays.

In operation, infrared rays emitted the light source 10 may be reflected by the main reflector 20*b*-1 and the sub reflector 20*b*-2, and may be moved in the direction for object sensing and in the direction for infrared display, respectively. Each of the main reflector 20*b*-1 and the sub reflector 20*b*-2 may have a curved shape such that infrared rays are moved by the main reflector 20*b*-1 in the direction for object sensing, and infrared rays reflected and moved by the main reflector 20*b*-1 are again reflected by the sub reflector 20*b*-2 and moved in the direction for infrared display.

The sub reflector 20*b*-2 may be disposed such that only some infrared rays reflected by the main reflector 20*b*-1 and moved are incident thereon. Accordingly, most infrared rays may be moved in the direction for object sensing, and some of the remaining infrared rays may be moved in the direction for infrared display.

The infrared filter 30 may be configured to filter out infrared rays in visible wavelength ranges such that infrared rays in wavelength ranges invisible to human eyes are emitted. As a result, visible infrared rays may be blocked in the direction for object sensing which corresponds to mobility vehicle traveling direction), and some infrared rays are emitted in a visible state in the direction for infrared display, thereby making operation of the infrared lamp identifiable from outside the mobility vehicle.

The infrared lamp device may further include the transmissive lens 40 disposed such that infrared rays reflected by the sub reflector 20*b*-2 and moved in the direction for infrared display are incident thereon, and the infrared rays are then emitted in a visible state. The transmissive lens 40 may be provided such that infrared rays reflected by the sub reflector 20*b*-2 and then moved are emitted as visible rays.

In embodiments, both the sub reflector 20*b*-2 and the transmissive lens 40, or one of the sub reflector 20*b*-2 and the transmissive lens 40, may include a color converter A such that infrared rays moving in the direction for infrared display are changed to a specific color and then emitted.

In an embodiment in which the sub reflector 20*b*-2 includes the color converter A, a color conversion coating having a specific color may be applied to the sub reflector 20*b*-2. In an embodiment in which the transmissive lens 40 includes the color converter A, the color conversion film may be applied to the transmissive lens 40. Accordingly, when infrared rays reflected by the sub reflector 20*b*-2 pass through the transmissive lens 40, the color converter A may change the color of the infrared rays, thereby variously expressing displays according to whether the infrared lamp is operating. In addition, the color of finally emitted infrared rays may be variously implemented in each embodiment in which the color converter A is applied to only one of the sub reflector 20*b*-2 and the transmissive lens 40, or the color converter A is applied to both the sub reflector 20*b*-2 and the transmissive lens 40.

Referring now to FIG. 4 to FIG. 6, an infrared lamp system for a mobility vehicle according to another embodiment of the present disclosure may include a first infrared module 100 including a first light source 10*a* and a first reflector 20*a*, and an infrared filter 30 configured such that infrared rays in invisible wavelength ranges are moved by the infrared filter 30 to a long or short distance. The infrared lamp system may also include a second infrared module 200 including a second light source 10*b* and a second reflector 20*b* configured such that visible infrared rays are emitted to a short distance.

In other words, the first infrared module 100 may be configured to emit infrared rays to a long or short distance, and in order to avoid confusion with other lamp functions when emitting infrared rays to a long distance, infrared rays in invisible wavelengths may be emitted by the infrared filter 30. Accordingly, the first infrared module 100 may emit infrared rays to a long or short distance, depending on the mobility vehicle traveling situation, thereby sensing external environments.

The second infrared module 200 may be configured to emit infrared rays to a short distance such that, by emitting infrared rays only to a short distance, external environments can be sensed through the infrared rays, and messages can be delivered by using lighting images of the infrared rays.

The first infrared module 100 may be installed such that infrared rays are emitted to the front, to the rear, or to both the front and the rear, of the mobility vehicle and the second infrared module 200 may be installed such that infrared rays are emitted to the side of the mobility vehicle. In other words, the first infrared module 100 may be configured such that infrared rays are emitted to the front or rear (relative to the mobility vehicle traveling direction), and the second infrared module 200 may be configured such that infrared rays are emitted from the side of the mobility vehicle toward road surfaces.

In various embodiments, the first infrared module 100 may operate in a high-speed traveling situation (when the transmission is shifted to D) so as to sense long-distance or short-distance external environments. The second infrared module 200 may operate in a low-speed traveling or parking situation both to sense external environments and to deliver messages to other vehicles or pedestrians.

In an example, the first infrared module 100 and the second infrared module 200 may be integrally configured at the head or rear lamp. For example, the first infrared module 100 and the second infrared module 200 may be separately configured and separately installed in the head or rear lamp, but by integrating the first infrared module 100 and the second infrared module 200, the entire package of the head or rear lamp can be reduced, making it easier to configure respective sensing areas through infrared rays from the first infrared module 100 and the second infrared module 200.

The infrared lamp system for a mobility vehicle may further include: an imaging device 60 that may be configured to capture images of the periphery of the mobility vehicle, sense infrared rays, and provide captured image information; and a display device 70 that may be configured to display captured image information and infrared rays on the basis of captured image information input from the imaging device 60.

The imaging device 60 may include a camera C configured to capture images of peripheral environments and to sense infrared rays. For example, the imaging device 60 may include a black box such that, when captured image information is collected in the direction in which infrared rays are emitted through the first infrared module 100, the display device 70 provided inside the mobility vehicle displays captured image information input from the imaging device 60. Not only peripheral environments, but also infrared rays from the first infrared module 100 may be displayed by the display device 70. For example, the first infrared module 100 may be configured to emit infrared rays such that guidelines are formed on both sides of the mobility vehicle, and although infrared rays from the first infrared module 100 may not be identifiable from the outside, infrared rays from the first infrared module 100 can be identified through the display device 70 inside the mobility vehicle, thereby providing guide information through infrared rays into the mobility vehicle without causing confusions to peripheral vehicles due to infrared rays.

In an embodiment, each of the first infrared module 100 and the second infrared module 200 may have an image-forming bezel 50 having a hole formed in a specific image such that light emitted in the direction for infrared display can be projected onto road surfaces in a pattern following the specific image.

In an example, each of the first infrared module 100 and the second infrared module 200 may have an image-forming bezel 50 such that infrared rays emitted by the first light source 10a and reflected by the first reflector 20a and infrared rays emitted by the second light source 10b and reflected by the second reflector 20b pass through respective holes of the image-forming bezels 50, thereby emitting lighting images according to the shape of the holes.

For example, the image-forming bezels 50 may have holes formed to extend in bar shapes such that, when infrared rays are emitted to a short distance through the first infrared module 100 and the second infrared module 200, guidelines are formed around the mobility vehicle. Accordingly, when peripheral environments are sensed through the infrared rays emitted by the first infrared module 100 and the second infrared module 200, guidelines may be formed around the mobility vehicle, thereby delivering messages according to the guidelines.

The first reflector 20a of the first infrared module 100 may be configured to change the direction of movement of infrared rays that have been incident after an angle change according to a command from a controller 80. In an example, the first reflector 20a may be configured to adjust angles according to on/off switching control under the control of the controller 80. For example, the angle of the first reflector 20a may be adjusted through motor control by adjusting the duty ratio that uses pulse width modulation (PWM) control. Accordingly, the direction of movement of infrared rays emitted by the first light source 10a may be changed selectively by the first reflector 20a with regard to a long distance or a short distance.

The first infrared module 100 and the second infrared 200 may be controlled by the controller 80. When the mobility vehicle travels at a preconfigured speed or higher, the controller 80 may receive long distance-related object information from the first infrared module 100. When the mobility vehicle travels below the predetermined speed, the controller 80 may receive short distance-related object information from the first infrared module 100 and the second infrared module 200. The second infrared module 200 may emit visible infrared rays around the mobility vehicle, thereby forming lighting patterns on road surfaces.

In an embodiment, when the vehicle travels at a preconfigured speed or higher (normal traveling situation confirmed), the controller 80 may adjust the first reflector 20a of the first infrared module 100 such that infrared rays emitted by the first light source 10a move to a long distance. In embodiments, this makes it possible to collect information necessary for traveling according to information regarding objects and peripheral environments in front of the mobility vehicle.

When the vehicle travels below the preconfigured speed (low-speed traveling or parking situation confirmed), the controller 80 may adjust the first reflector 20a of the first infrared module 100 such that infrared rays emitted by the first light source 10a move to a short distance in front of the mobility vehicle. The second infrared module 200 may also operate such that infrared rays emitted by the second light source 10b are reflected by the second reflector 20b and moved to a short distance toward the side of the mobility vehicle. In embodiments, this enables the mobility vehicle to receive information regarding short-distance external environments around the mobility vehicle while traveling at a low speed, thereby generating a sensing area optimized for the low-speed traveling situation. The second infrared module 200 may emit infrared rays in a visible state to road surfaces such that lighting patterns are formed on the road surfaces, thereby delivering warning messages to peripheral vehicles or pedestrians.

As such, according to embodiments of the present disclosure, the first infrared module 100 and the second infrared module 200 may be selectively operated according to the mobility vehicle traveling situation, thereby efficiently sensing peripheral environments, and delivering messages to the outside through infrared rays.

As illustrated in FIG. 7 to FIG. 10, an infrared lamp system for a mobility vehicle according to another embodiment of the present disclosure may include a first infrared module 100 including a first light source 10a, a first reflector 20a, and a first infrared filter 30a such that infrared rays are emitted to the front or rear of the mobility vehicle, and infrared rays in invisible wavelength ranges are moved by the infrared filter 30 to a long distance. The infrared lamp system may also include a second infrared module 200 including a second light source 10b, a second reflector 20b, and a second infrared filter 30 such that infrared rays are emitted to the front or rear of the mobility vehicle, and infrared rays in invisible wavelength ranges are moved by the infrared filter 30 to a long distance and to a short distance. The infrared lamp system may further include a third infrared module 300 including a third light source 10c and a third reflector 20c such that infrared rays are emitted to the side of the mobility vehicle, and visible infrared rays are emitted to a short distance. The infrared lamp system may also include may additionally a controller 80 configured to control the first infrared module 100, the second infrared module 200, and the third infrared module 300.

In an embodiment, the first infrared module 100 and the second infrared module 200 may be configured to emit infrared rays to the front or rear (mobility vehicle traveling direction), and the third infrared module 300 may be configured to emit infrared rays to the side of the mobility vehicle.

For example, the first infrared module 100 may be configured to emit infrared rays to a long distance to the front of the mobile vehicle, and in order to avoid confusion with other lamp functions when emitting infrared rays to a long distance, infrared rays in invisible wavelengths may be emitted by the first infrared filter 30a. Accordingly, the first infrared module 100 may play the role of sensing objects in front of or behind the mobility vehicle.

The second infrared module 200 may be configured to emit infrared rays to a long distance and to a short distance, and in order to avoid confusion with other lamp functions when emitting infrared rays to a long distance, infrared rays in invisible wavelengths may be emitted by the second infrared filter 30b. In addition, the second infrared module 200 may be configured such that some infrared rays are emitted to a short distance as well, thereby sensing external environments through infrared rays, and delivering messages by using lighting images of infrared rays. Accordingly, the second infrared module 200 may deliver messages in addition to sensing objects in front of or behind the mobility vehicle.

The third infrared module 300 may be configured to emit infrared rays to a short distance such that, as infrared rays are emitted only to a short distance, external environments can be sensed through the infrared rays, and messages can be delivered by using lighting images of the infrared rays.

In an embodiment, the controller 80 may selectively operate the first infrared module 100, the second infrared module 200, and the third infrared module 300 according to the mobility vehicle traveling situation, thereby efficiently sensing peripheral environments, and delivering messages to the outside through infrared rays.

In an embodiment, when the mobility vehicle travels at a preconfigured speed or higher, the controller 80 may receive long distance-related object information from the first infrared module 100 and the second infrared module 200. When the mobility vehicle travels below the predetermined speed, the controller 80 may receive short distance-related object information from the second infrared module 200 and the third infrared module 300. The third infrared module 300 may emit visible infrared rays around the mobility vehicle, thereby forming lighting patterns on road surfaces.

Accordingly, when the vehicle travels at a preconfigured speed or higher (normal traveling situation confirmed), the controller 80 may operate the first infrared module 100 and the second infrared module 200 such that infrared rays emitted by the first light source 10a and the second light source 10b move to a long distance. In embodiments, this makes it possible to collect information necessary for traveling according to information regarding objects and peripheral environments in front of the mobility vehicle. In addition, the second infrared module 200 may move infrared rays to a short distance from the mobility vehicle such that long-distance information and short-distance information are gathered through the first infrared module 100 and the second infrared module 200, respectively, thereby securing sensing accuracy.

When the vehicle travels below the preconfigured speed (low-speed traveling or parking situation confirmed), the controller 80 may not operate the first infrared module 100 and may operate the second infrared module 200 and the third infrared module 300 such that infrared rays move to short distances to the front and side of the mobility vehicle, thereby sensing peripheral objects. In embodiments, this enables the mobility vehicle to receive information regarding short-distance peripheral environments around the mobility vehicle while traveling at a low speed, thereby generating a sensing area optimized for the low-speed traveling situation. The second infrared module 200 may emit infrared rays to road surfaces in front of the mobility vehicle such that infrared rays identified through a black box can be identified inside the mobility vehicle. The third infrared module 300 may emit infrared rays in a visible state to road surfaces to the side of the mobility vehicle such that lighting patterns are formed on the road surfaces, thereby delivering warning messages to peripheral vehicles or pedestrians.

Accordingly, the first infrared module 100, the second infrared module 200, and the third infrared module 300 may be selectively operated according to the mobility vehicle traveling situation, thereby efficiently sensing peripheral environments, and delivering messages to the outside through infrared rays.

The infrared lamp system may further include: an imaging device 60 configured to capture images of the periphery of the mobility vehicle, sense infrared rays, and provide captured image information; and a display device 70 configured to display captured image information and infrared rays on the basis of captured image information input from the imaging device 60.

The imaging device 60 may include a camera C configured to capture images of peripheral environments and to sense infrared rays. For example, the imaging device 60 may include a black box such that, when captured image information is collected in the direction in which infrared rays are emitted through the second infrared module 200, the display device 70 provided inside the mobility vehicle displays captured image information input through the imaging device 60. Not only peripheral environments, but also infrared rays by the second infrared module 200 are displayed by the display device 70. For example, the second infrared module 200 may be configured to emit infrared rays to a short distance such that guidelines are formed on both sides of the mobility vehicle, and although infrared rays from the second infrared module 200 may be not identifiable from the outside, infrared rays from the second infrared module 200 can be identified through the display device 70 inside the mobility vehicle, thereby providing guide information through infrared rays into the mobility vehicle without causing confusions to peripheral vehicles due to infrared rays.

Referring to FIG. 9, according to an embodiment, the second reflector 20b of the second infrared module 200 may include a first reflecting surface 20b-3 and a second reflecting surface 20b-4 having different radii of curvature, onto which infrared rays emitted by the second light source 10b may be incident. The first reflecting surface 20b-3 may be formed such that incident infrared rays move to a long distance, and the second reflecting surface 20b-4 may be formed such that incident infrared rays move to a short distance.

In an embodiment, the second reflector 20b of the second infrared module 200 includes a first reflecting surface 20b-3 and a second reflecting surface 20b-4 formed such that some infrared rays are moved to a long distance, and the remaining infrared rays are moved to a short distance. The first reflecting surface 20b-3 of the second reflector 20b may be configured such that infrared rays, when reflected, are moved to a long distance. Only a part of the first reflecting surface 20b-3 may be configured as the second reflecting surface 20b-4 such that most infrared rays emitted by the second light source 10b are reflected by the first reflecting surface 20b-3 and moved to a long distance, and some of the remaining infrared rays are moved to a short distance through the second reflecting surface 20b-4. A second infrared filter 30 may be provided on the path of infrared rays reflected by the first reflecting surface 20b-3 of the second infrared module 200 and then moved to a long distance. An image-forming bezel 50 may be formed on the path of infrared rays reflected by the second reflecting surface 20b-4 and then moved to a long distance such that lighting patterns are formed on road surfaces.

Referring to FIG. 10, the second infrared module 200 may include a projection lens 90 disposed such that infrared rays reflected by the second reflector 20b are incident thereon. The projection lens 90 may have a total internal reflection portion 91 formed to totally reflect some of the infrared rays incident through the second light source 10b or the second reflector 20b, thereby emitting some of the infrared rays to a short distance.

In an embodiment, the second infrared module 200 may further include a projection lens 90 in front of the second reflector 20b such that some incident infrared rays are moved to a long distance, and the remaining infrared rays are moved to a short distance through the total internal reflection portion 91. In an example, the second reflector 20b is formed such that incident infrared rays are moved to a long distance, and has a total internal reflection portion 91 formed on the upper portion thereof so as to have a section larger than the critical angle of infrared rays, thereby moving infrared rays reflected by the total internal reflection portion 91 downwards to a short distance. An image-forming bezel 50 may be formed on the path of infrared rays reflected by the total internal reflection portion 91 and moved to a short distance, thereby forming lighting patterns on road surfaces.

The infrared lamp device for a mobility vehicle and the infrared lamp system for a mobility vehicle, having the above-described structures, display whether an infrared sensor for sensing peripheral environments during night traveling so as to secure traveling stability is operating, and use infrared rays not only to sense peripheral environments, but also to deliver messages, thereby securing traveling stability and convenience.

Although the present disclosure has been described and illustrated in conjunction with particular embodiments thereof, it should be apparent to those having ordinary skill in the art that various improvements and modifications may be made to the present disclosure without departing from the technical idea of the present disclosure.

What is claimed is:

1. An infrared lamp device for a mobility vehicle, the infrared lamp device comprising:
   a light source configured to emit infrared rays;
   a reflector configured such that infrared rays from the light source are incident thereon, the reflector being configured to reflect the incident infrared rays such that some infrared rays are moved in a direction for object sensing and remaining infrared rays are moved in a direction for infrared display; and
   an infrared filter provided in a position in which infrared rays are reflected by the reflector and moved in the direction for object sensing, the infrared filter being configured to filter out infrared rays in a preconfigured wavelength range,
   wherein some of the infrared rays that are reflected by the reflector and moved in the direction for infrared display are emitted in a visible state, and
   wherein the infrared filter is disposed to be spaced apart from the reflector while facing the reflector.

2. The infrared lamp device of claim 1, further comprising a transmissive lens disposed such that some infrared rays reflected by the reflector and moved in the direction for infrared display are incident thereon and then emitted.

3. The infrared lamp device of claim 2, wherein the transmissive lens has an image-forming bezel having a hole formed in a figure or character shape such that infrared rays pass through the hole of the image-forming bezel and are emitted as lighting image in the figure or the character shape.

4. The infrared lamp device of claim 1, further comprising a sub reflector provided between the reflector and the infrared filter so as to reflect infrared rays moved in the direction for object sensing such that the infrared rays are moved in the direction for infrared display.

5. The infrared lamp device of claim 4, further comprising a transmissive lens disposed such that infrared rays reflected by the sub reflector and moved in the direction for infrared display are incident thereon and then emitted.

6. The infrared lamp device of claim 5, wherein one or both of the sub reflector and the transmissive lens comprise a color converter configured such that infrared rays moved in the direction for infrared display are converted to a specific color and then emitted.

7. An infrared lamp system for a mobility vehicle, the infrared lamp system comprising:
   a first infrared module comprising a first light source, a first reflector, and an infrared filter such that infrared rays in an invisible wavelength range are moved to a long distance or a short distance by the infrared filter, wherein the infrared filter is disposed to be spaced apart from the first reflector while facing the first reflector; and
   a second infrared module comprising a second light source and a second reflector such that infrared rays are emitted to a short distance in a visible state.

8. The infrared lamp system of claim 7, wherein the first infrared module and the second infrared module are integrally configured in a headlamp or a rear lamp.

9. The infrared lamp system of claim 7, further comprising:
   an imaging device configured to provide captured image information by capturing images around a mobility vehicle and sensing infrared rays; and
   a display device configured to display captured image information and infrared rays based on captured image information input through the imaging device.

10. The infrared lamp system of claim 7, wherein:
    the first infrared module is installed such that infrared rays are emitted to one or both of a front and a rear of the mobility vehicle, and
    the second infrared module is installed such that infrared rays are emitted to a side of the mobility vehicle.

11. The infrared lamp system of claim 7, wherein each of the first infrared module and the second infrared module has an image-forming bezel having a hole formed in a specific image such that light emitted in a direction of infrared display is projected onto a road surface in a pattern following the specific image.

12. The infrared lamp system of claim 7, wherein the first reflector of the first infrared module is configured to change a direction of movement of infrared rays which have been incident after an angle change according to a command from a controller.

13. The infrared lamp system of claim 7, further comprising a controller configured to control the first infrared module and the second infrared module,
wherein:
the controller is configured to receive long distance-related object information from the first infrared module when the mobility vehicle travels at a predetermined speed or higher, and
the controller is configured to receive short distance-related object information from the first infrared module and the second infrared module when the mobility vehicle travels below the predetermined speed, and wherein visible infrared rays are emitted around the mobility vehicle by the second infrared module such that a lighting pattern is formed on a road surface.

14. An infrared lamp system comprising:
a first infrared module comprising a first light source, a first reflector, and a first infrared filter, the first infrared module being i) installed such that infrared rays are emitted to a front or rear of a mobility vehicle and ii) configured such that infrared rays in an invisible wavelength range are moved to a long distance by the first infrared filter, wherein the first infrared filter is disposed to be spaced apart from the first reflector while facing the first reflector;
a second infrared module comprising a second light source, a second reflector, and a second infrared filter, the second infrared module being i) installed such that infrared rays are emitted to the front or rear of the mobility vehicle and ii) configured such that infrared rays in an invisible wavelength range are moved to the long distance and to a short distance by the second infrared filter, wherein the second infrared filter is disposed to be spaced apart from the second reflector while facing the second reflector;
a third infrared module comprising a third light source and a third reflector, the third infrared module being ii) installed such that infrared rays are emitted to a side of the mobility vehicle and ii) configured such that infrared rays are emitted in a visible state to the short distance; and
a controller configured to control the first infrared module, the second infrared module, and the third infrared module.

15. The infrared lamp system of claim 14, further comprising:
an imaging device configured to provide captured image information by capturing images around the mobility vehicle and sensing infrared rays; and
a display device configured to display captured image information and infrared rays based on captured image information input through the imaging device.

16. The infrared lamp system of claim 14, wherein the second reflector of the second infrared module comprises a first reflecting surface and a second reflecting surface having different radii of curvature, onto which infrared rays emitted by the second light source are incident, the first reflecting surface is formed such that incident infrared rays are moved to the long distance, and the second reflecting surface is formed such that incident infrared rays are moved to the short distance.

17. The infrared lamp system of claim 14, wherein the second infrared module comprises a projection lens disposed such that infrared rays reflected by the second reflector are incident thereon, wherein the projection lens has a total internal reflection portion formed to totally reflect some of the infrared rays incident through the second light source or the second reflector, thereby emitting some of the infrared rays to the short distance.

18. The infrared lamp system of claim 14, wherein the controller is configured to:
receive long distance-related object information from the first infrared module and the second infrared module when the mobility vehicle travels at a predetermined speed or higher, and
receive short distance-related object information from the second infrared module and the third infrared module when the mobility vehicle travels below the predetermined speed, and wherein visible infrared rays are emitted around the mobility vehicle by the third infrared module such that a lighting pattern is formed on a road surface.

* * * * *